United States Patent [19]

Romick

[11] 4,050,328

[45] Sept. 27, 1977

[54] FOUR-WHEEL DRIVE VEHICLE WITH DRIVE TRANSFER GEAR ASSEMBLY

[75] Inventor: Rowland C. Romick, Mount Clemens, Mich.

[73] Assignee: Eaton Corporation, Cleveland, Ohio

[21] Appl. No.: 580,113

[22] Filed: May 22, 1975

Related U.S. Application Data

[62] Division of Ser. No. 296,360, Oct. 10, 1972, Pat. No. 3,901,092.

[51] Int. Cl.² .............................................. F16H 1/44
[52] U.S. Cl. ..................................... 74/711; 74/710.5
[58] Field of Search ................ 64/28, 29, 30 R, 30 A; 180/44 R; 192/54, 56 R, 56 F, 67 R; 74/674, 675, 695–728, 710, 710.5, 711

[56] References Cited

U.S. PATENT DOCUMENTS

| | | | |
|---|---|---|---|
| 2,632,542 | 3/1953 | Hendrickson | 64/30 A |
| 2,791,130 | 5/1957 | Boughner | 74/695 |
| 3,648,483 | 3/1972 | Garcia | 64/30 R |
| 3,780,821 | 12/1973 | Prange | 74/710.5 |
| 3,827,520 | 8/1974 | Mueller | 180/44R |
| 3,862,667 | 1/1975 | Wolansky | 180/43 R |

*Primary Examiner*—Samuel Scott
*Assistant Examiner*—Frank H. McKenzie, Jr.
*Attorney, Agent, or Firm*—Teagno & Toddy

[57] ABSTRACT

A drive transfer gear assembly for a four-wheel drive truck tractor. The tractor includes a front drive steer axle assembly, a rear drive axle assembly containing the drive transfer gear assembly, and a prime mover drivingly connected to the front and rear drive mechanisms by the drive transfer gear assembly. The front axle assembly includes a rigid axle housing having end sections and a drop center section containing a differential gear set with output gears drivingly connected to wheels pivotally journaled at the outboard ends of the rigid axle housing. The rear axle assembly includes a differential gear set with output gears drivingly connected to the rear wheels, and a drive transfer gear assembly positioned forwardly of the differential gear set. The drive transfer gear assembly includes a torque proportioning planetary gear set, an angled tooth clutch for locking the planetary gear set in response to front wheel spinout, a manual clutch for preventing differentiation of the gears in the planetary gear set, and a torque limiting clutch for preventing overtorque to the front wheel drive mechanism.

15 Claims, 5 Drawing Figures

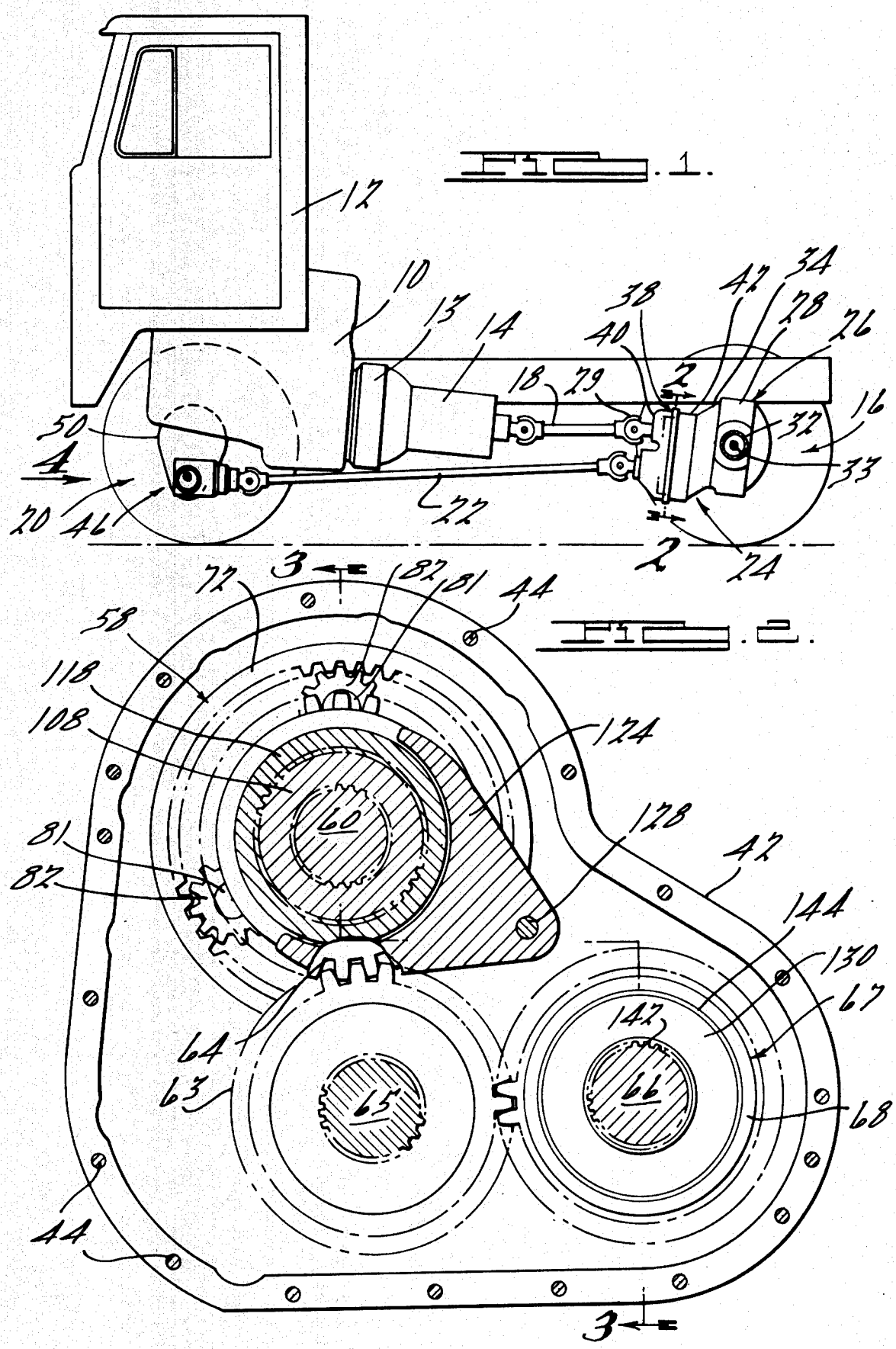

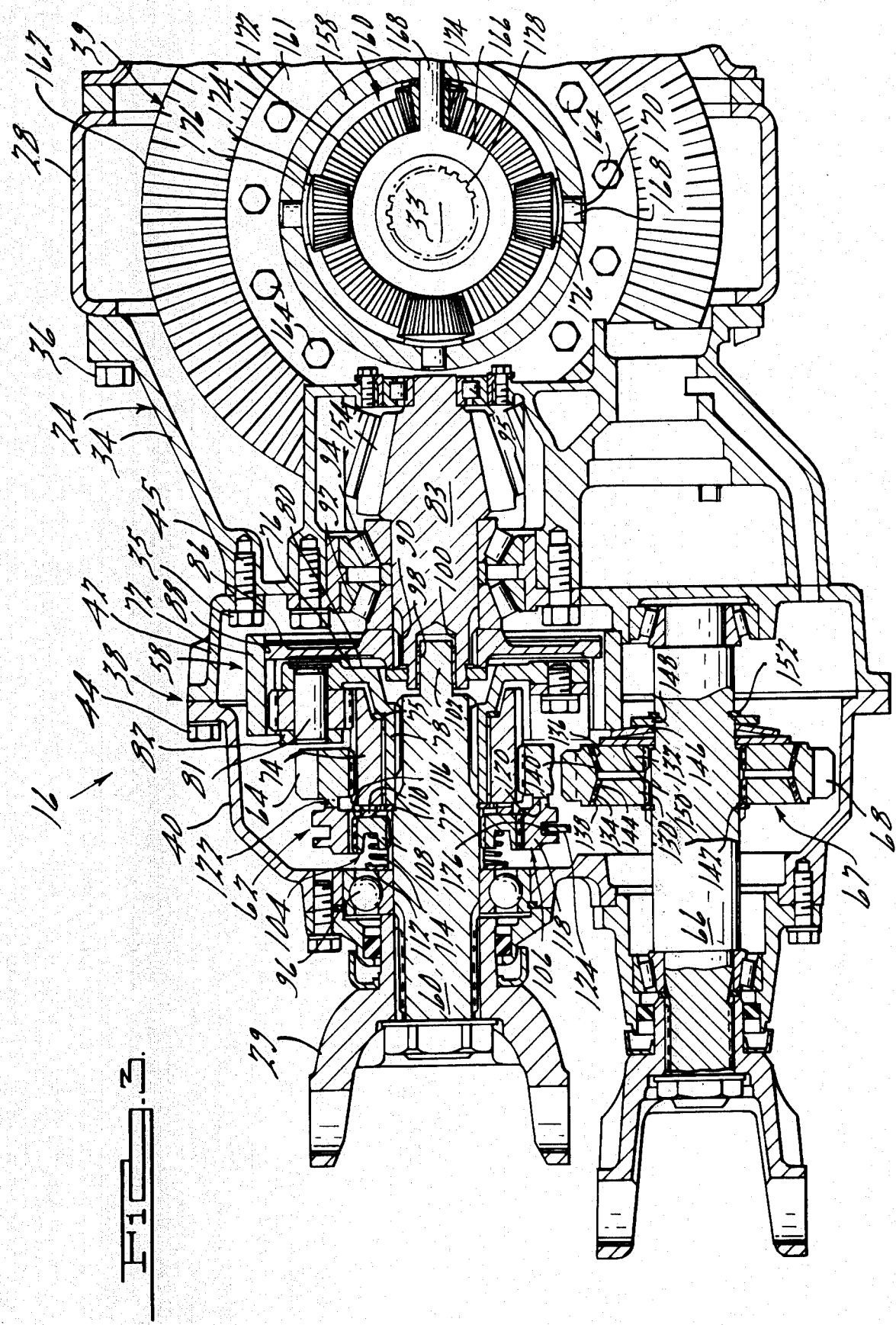

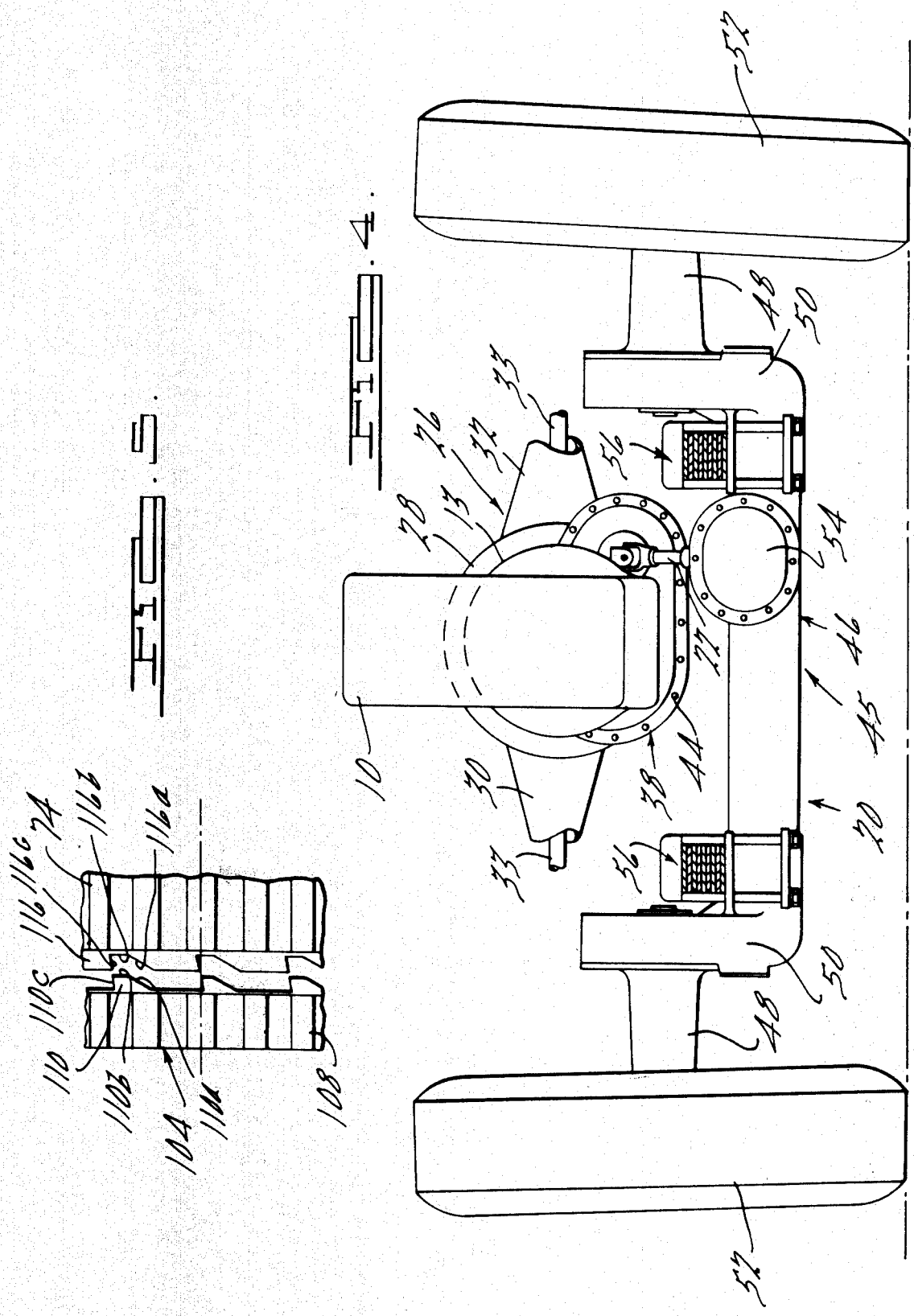

FOUR-WHEEL DRIVE VEHICLE WITH DRIVE TRANSFER GEAR ASSEMBLY

This is a division of application Ser. No. 296,360 filed Oct. 10, 1972 now U.S. Pat. No. 3,901,092.

BACKGROUND OF THE INVENTION

This invention relates to four-wheel drive motor vehicles and, particularly, to four-wheel drive motor vehicles employing a drive transfer gear assembly in the drive train which functions to apportion the torque between the front and rear drive axles.

Many drive transfer gear assemblies of the torque proportioning type have been proposed heretofore. However, these prior art units have met with, at best, only limited commercial success because of several disadvantages. Specifically, these prior art units, particularly when equipped with a one-way clutch device to lock up the gear set upon front wheel overspin, fail to anticipate and make satisfactory provision for particularly damaging torque overload conditions that applicant has found to be generated in various special situations. Further, the one-way clutches provided with these prior art units have been of a relatively bulky and relatively expensive design and the durability of these clutches has been found to be marginal in certain duty cycles. Further, these prior art devices, by their inherent design configuration, have created a relatively high center of gravity for the total rear axle assembly and have complicated the job of providing clearance between the front axle drive shaft and various drive train components.

SUMMARY OF THE INVENTION

It is a primary object of the present invention to provide a torque proportioning drive transfer gear assembly which overcomes the noted disadvantages of the prior art units.

A more specific object is to provide a torque proportioning drive transfer gear assembly that is more durable, more efficient, and less expensive than the prior art units.

Another object is to provide an improved total drive train package for a four-wheel drive vehicle.

According to an important feature of the present invention, a drive transfer gear assembly is provided in which front and rear output shafts are differentially driven from a common input shaft and means are provided which function to limit the magnitude of the torque delivered to one of the output shafts. In the disclosed embodiment of the invention, a one-way clutch is provided which functions to lock up the gear assembly upon the occurrence of front output shaft overspin generated, for example, by a spinout of the front vehicle wheels or by heavy braking of the rear vehicle wheels, and the torque limiting means functions to limit the magnitude of the torque delivered to the front output shaft during the lock up condition of the gear assembly.

According to another feature of the invention, the one-way clutch includes a pair of annular sets of coacting angled teeth which are relatively rotatable in response to relative rotation between the two output gears of the drive transfer gear set, and the clutch operates in response to such relative rotation in one directional mode to lockingly engage the teeth sets to preclude such relative rotation and in response to such relative rotation in the other directional mode to provide slippage between the teeth sets. In the disclosed embodiment of the invention, the drive transfer gear set is of the planetary type with input to the planets and outputs through the sun and ring gears, and one tooth set of the one-way clutch is provided on an annular end face of the sun gear and the coacting tooth set is provided on the adjacent end face of an annular member which is axially slideably on the input shaft and biased into engagement with the first tooth set.

According to another feature of the invention, lock means are provided which operate when actuated to preclude relative rotation of the output gears of the drive transfer gear assembly in the directional mode permitted by the one-way clutch.

According to another feature of the invention, a rear axle assembly is provided in which a drive transfer gear assembly of the torque proportioning type is positioned in the rear axle immediately forwardly of the rear axle differential gear set and the rear output shaft of the drive transfer gear assembly meshes directly at its rearward end with the ring gear of the rear axle differential gear set.

According to yet another feature of the invention, the drive transfer gear assembly is disposed within the rear axle assembly housing forwardly of the rear axle differential gear set, and the output shaft of the drive transfer gear assembly providing the drive for the vehicle front axle is spaced laterally of the longitudinal axis of the vehicle and below the rear axle axis, whereby to provide a low starting point for the front drive shaft to facilitate clearance of the various drive train components. In the disclosed embodiment, the front drive axle is of the drop center type and the forward end of the front drive shaft drivingly connects to a front axle differential mounted in the dropped center section of the front axle housing, whereby to provide a relatively low terminal point for the front drive shaft to further facilitate clearance of the drive train components.

These and other objects, features and advantages of the invention will be apparent from the drawings and from the detailed description of the preferred embodiment.

BRIEF DESCRIPTION OF THE DRAWINGS

In the drawings:

FIG. 1 is a somewhat schematic view of a motor vehicle embodying the torque proportioning drive transfer gear assembly of the invention;

FIG. 2 is a cross-sectional view taken on line 2—2 of FIG. 1;

FIG. 3 is a cross-sectional view taken on line 3—3 of FIG. 2;

FIG. 4 is a somewhat schematic, partially fragmentary view looking in the direction of the arrow 4 in FIG. 1 with the rear axle assembly raised slightly relative to the front axle assembly for purposes of clarity; and FIG. 5 is an enlarged, fragmentary view of a one-way clutch utilized in the invention gear assembly.

DESCRIPTION OF THE PREFERRED EMBODIMENT

The motor vehicle seen in FIG. 1 is of the truck tractor type and, broadly considered, includes an engine 10, a body 12 of the cab-over-engine type, a clutch 13, a ratio change transmission 14, a rear axle assembly 16 drivingly coupled to transmission 14 by engine drive shaft 18, and a front drive axle assembly 20 drivingly coupled to rear axle assembly 16 by front drive shaft 22.

The various drive components of rear axle assembly 16 are housed in a rigid unitary housing assembly 24. Housing assembly 24, best seen in FIG's. 3 and 4, includes a rigid rear axle housing 26 having a differential banjo housing portion 28 and axle shaft housing portions 30, 32; a differential carrier housing 34 secured to banjo housing portion 28 by a plurality of bolts 36 (FIG. 3); and a drive transfer housing 38 having front and rear housing sections 40, 42 secured together by a plurality of bolts 44. Housing section 42 is secured to differential carrier housing 34 by a plurality of bolts 35. Axle shaft housing portions 30, 32 journal a pair of rear wheel drive shafts 33.

Front axle assembly 20, partially shown in FIG. 1 but best seen in FIG. 4, includes a rigid unitary housing assembly 45 having a drop center section housing 46, a pair of end section housings 48, and a pair of gear reduction housings 50. A pair of wheel assemblies 52 are pivotally secured to the outboard ends of end section housings 48. Center section housing 46 includes a low profile differential housing portion 54, containing a differential gear set (not shown) connected at its input to front drive shaft 22. A pair of suspension spring assemblies 56 are mounted on center section housing 46 to support body 12 on axle assembly 20. Further details of front axle assembly 20, including details of the housing assembly and the various drive components within the housing assembly, are disclosed in copending U.S. Patent Application Ser. No. 293,204 filed Sept. 28, 1972, now U.S. Pat. No. 3,862,667 and assigned to the assignee of this application.

Referring now to FIG's. 2 and 3, a drive transfer gear assembly is positioned in drive transfer housing 38 and a rear axle differential gear set 39 is positioned in differential banjo housing portion 28. The drive transfer gear assembly includes a planetary gear assembly 58 concentric to an input shaft 60; a double clutch mechanism 62 also concentric to shaft 60; an idler gear 63 in mesh with an idler drive gear 64 of the planetary gear assembly and secured to an idler shaft 65; and a front drive output shaft 66 carrying a torque limiting clutch assembly 67. An annular gear 68, formed as part of the torque limiting clutch assembly, is in mesh with and driven by idler gear 63. Input shaft 60, which is coupled to engine drive shaft 18 by universal joint 29, rotates in a counterclockwise direction, as viewed from the rear, for forward vehicle motion.

Planetary gear assembly 58, as best seen in FIG. 3, includes a planet gear assembly 70, a ring gear 72, and a sun gear 74. Planet gear assembly 70 includes a planet carrier 76 having a hub portion 78 splined to input shaft 60, a spider 80, three stub shafts 81, and three planet pinions 82 journaled on the shafts 81 and in mesh with the ring and sun gears. Ring gear 72 is connected to an output shaft 83 by a spider 86 splined at 88 to the ring gear and at 90 to output shaft 83. Output shaft 83 is journaled near its forward end by a pair of tapered roller bearings 92, 94 supported by housing portion 42, and at its rearward end by a roller bearing 95 supported by differential housing 34. Output shaft 83 is coaxial to input shaft 60; shaft 60 is journaled at its forward end in a ball bearing 96 and at its rearward end within a sleeve bearing 98. Sleeve bearing 98 is positioned in an axial pilot bore 100 in the forward end of output shaft 83 and receives a necked down pilot portion 102 on the rearward end of input shaft 60. Sun gear 74 is journaled on hub portion 78 of planet carrier 76, and is secured against axial movement relative to hub portion 78 and input shaft 60 by thrust washers 75 and 77. Idler drive gear 64 is splined to sun gear 74.

Planetary gear set 58 is designed to proportion torque between the front and rear axles in relation to a contemplated loading ratio for the axles. For the disclosed embodiment, the rear axle loading is twice the front axle loading; hence, the planetary gear set is designed to proportion approximately 64% of its output torque to rear output shaft 83 and 36% to front output shaft 66.

With continued reference to FIG. 3, double clutch assembly 62 includes an angled tooth ratchet clutch 104 and a straight tooth clutch 106. Angled tooth clutch 104 includes an annular member 108 slideably splined on input shaft 60 and having an annular set of angled teeth 110; a spring retainer 112; a helical spring 114; and a coacting annular set of angled teeth 116 formed on the adjacent annular end face of sun gear 74. The specific shapes of the annular sets of angled teeth 110 and 116 are shown in FIG. 5. Each tooth 110 includes an angled rise face 110a, a dwell face 110b, and an engaging face 110c undercut somewhat with respect to the rotational axis of member 108. Each tooth 116 includes an angled rise face 116a, a dwell face 116b, and an engaging face 116c undercut somewhat with respect to the rotational axis of member 108. With reference again to FIG. 3, straight tooth clutch 106 includes an annular member 118 slideably splined on the outer periphery of annular member 108 and having an annular set of straight teeth 120; a coacting annular set of straight teeth 122 formed on the adjacent annular end face of idler drive gear 64, and a shift fork 124 loosely received in an annular groove 126 in member 118. Shift fork 124, as best seen in FIG. 2, includes a push rod 128 to effect axial movement of annular member 118. Push rod 128 may be controlled by the vehicle operator in the vehicle cab in any of several well known manners, viz a remotely controlled air motor or solenoid valve mounted on the transfer housing or a push-pull linkage system.

Torque limiting clutch 67 is a double cone clutch and, as best seen in FIG. 3, includes a pair of annular members 130, 132 slideably splined to output shaft 66 and defining on their outer periphery frusto-conical surfaces 134, 136 which mate with a pair of frusto-conical surfaces 138, 140 defined on the inner periphery of annular gear 68. A snap ring 142 prevents forward axial movement of member 130 along shaft 66. Conical surfaces 134, 136 have bonded thereto a suitable lining material 144 selected for its frictional, wear, and load bearing properties such as Raybestos-Manhattan frictional material Number X-16987. Lining material 144 is biased into frictional engagement with conical surfaces 138, 140 by a disc spring 146 which bears against a spacer 148 at its rearward side and a hardened thrust plate 150 at its forward side. Spacer 148 is retained against rearward axial movement along output shaft 66 by a snap ring 152.

A beveled pinion 154 is formed on the rearward end of output shaft 82. The axis of pinion 154, which is coaxial with the axes of input shaft 60 and output shaft 83, intersects the rotational axis of differential gear set 39. Differential gear set 39 is supported within differential banjo housing portion 28 by differential carrier housing 134 in a well known manner (not shown). Differential gear set 38 includes a differential case or carrier 158 housing a differential gear train 160; case 158 has a radially extending flange 161 to which a beveled ring gear 162 is secured by a plurality of bolts 164. Ring gear 162 is in mesh with pinion 154. Differential gear train 160 includes a spider 166 having four radially extending shafts 168 which are held at their outer ends within four bores 170 in case 158; a pair of beveled side gears 172 (one of which is shown); four beveled side pinions 174 journaled on shaft 168; and four side pinion thrust washers 176 interposed between the side pinions and case 158. Side gears 172 are splined to the rear wheel drive shafts 33 in a conventional manner as shown at 178.

As may be seen in FIG. 3, the drive transfer gear assembly is positioned directly in front of rear axle differential gear set 39 with planetary gear set 58 positioned concentric to input and output shafts 60 and 82. This positional relationship of the drive transfer gear assembly facilitates direct coupling of output shaft 82 to rear axle differential 39, thereby minimizing the number of drive components required to connect the ring gear of planetary gear assembly to the rear axle differential gear set, maintaining a relatively low center of gravity for rear axle assembly 24, and facilitating relatively low placement of output shaft 66 to facilitate clearance between front drive shaft 22 and the various vehicle drive train components. Clearance between front drive shaft 22 and the various vehicle drive train components is further enhanced by the low input position of the front axle differential in the dropped center section of the front axle assembly. As best seen in FIG. 4, front drive shaft 22 effectively clears engine 12, clutch 13, and transmission 14. This clearance is attributable to the relatively low disposition of the output of the transfer gear assembly and the input of the front axle differential assembly and the substantially equal displacement of this output and input to the right (as viewed in FIG. 4) of the vehicle longitudinal center line. The described arrangement allows the necessary front drive shaft clearance.

For the embodiment shown, idler drive gear 64 has 31 teeth, idler gear 63 has 30 teeth, and annular gear 68 has 30 teeth; these gears provide a ratio between the sun gear and front drive shaft 66 which tends to unbalance the forces acting on planet pinion 82. This imbalance causes the planets to creep relative to the ring and sun gears and thereby drive the sun approximately 3% slower than the ring gear and 1.5% slower than input shaft 60. Therefore, under normal driving conditions, that is with the input torque to all wheels below the slip torque of the wheels, input shaft 60 will turn 1.5% faster than he sun gear 74. Hence, the angled faces 110a, 116a of the angle teeth on the annular tooth sets will interact to allow slippage between the tooth sets. During rapid forward vehicle acceleration or when the front wheels are on a low frictional coefficient surface and being driven in the forward direction, the slip torque at the front wheels may become less than the torque obtainable from the sun gear 74; this causes the front wheels to spin and sun gear 74 to rotate faster than input shaft 60, thereby bringing the undercut faces 110c, 116c of the angled teeth on the annular tooth sets into engagement and locking the planetary gear set against further differential rotation. The described toothed clutch arrangement provides a compact, inexpensive and fast response one-way clutch that has been found to function reliably, and with excellant durability, in all contemplated duty cycles.

During vehicle forward operation, when the rear axle wheels are on a low frictional coefficient surface or lightly loaded, the slip torque at the rear wheels may become less than the torque obtainable from ring gear 72. In this situation the rear wheels will spin and input shaft 60 will rotate faster than the sun gear 74; this undesirable spinout is not prevented by the ratchet clutch 104 since angled faces 110a, 116a of the angled clutch teeth continue to slippingly interact. However, straight tooth clutch 106, which is selectively controllable by the vehicle operator, is provided to stop rear wheel spin by sliding annular member 118 into engagement with teeth 122 to lock the planetary gear set against differentiation. The disclosed straight tooth clutch 106, which is splined to the outer periphery of ratchet clutch 104 in piggyback fashion, provides a reliable and inexpensive clutch which is extremely compact with respect to the rotational axis of the clutch.

During vehicle rearward operation the locking mode of ratchet clutch 104 is reversed; that is, ratchet clutch 104 functions to automatically lock the planetary gear set when the rear wheels spin but allows front wheel spinout; in this situation, straight tooth clutch 106 may be engaged to prevent or stop front wheel spin.

Torque limiting clutch 67 is provided to protect the front axle drive components from overtorque during certain operational situations. One such situation may occur when the engine is accelerated to a high rpm and then suddenly connected by the vehicle clutch to the transfer gear assembly. In this situation, the engine may produce impulse forces which could be damaging if imposed on the front drive components. Another and more frequently occurring situation is when the vehicle is braked during modes of operation in which the rear wheel loading is less than design loading, such, for example, as a truck tractor operating in a "bobtail" or trailerless configuration. In such a situation, the rear brakes may lock and thereby lock the planetary gear set through the automatic locking action of the ratchet clutch, thereby applying the full rear wheel braking torque, which could be much greater than engine torque, to the front drive components.

What is claimed is:

1. In a motor vehicle of the type including a prime mover, front and rear drive axles; drive means interconnecting said prime mover and said front and rear axles and including a drive transfer assembly comprising:
   A. an input shaft drivingly connected to said prime mover;
   B. a first output shaft drivingly connected to said rear axle;
   C. a second output shaft rotatable relative to said first output shaft and drivingly connected to said front axle;
   D. means operative in response to relative rotation between said output shafts in one directional mode to preclude such relative rotation; and
   E. means drivingly interconnecting said shafts and operative to apportion the torque received by said input shaft between said first output shaft and said second output shaft and including means operative during operation of said rotation precluding means to limit the magnitude of the torque transmitted to one of said output shafts from said input shaft.

2. The vehicle of claim 1, wherein said rotation precluding means includes:
   F. a first pair of clutch members having matable angle teeth; and
   G. means biasing said matable angle teeth into engagement.

3. The vehicle of claim 2, wherein: said means drivingly interconnecting includes first and second gears and
H. one of said members is secured to rotate with said second output gear and the other of said members is secured to rotate with said input shaft.

4. The vehicle of claim 3, wherein:
I. said other member is slideably splined to said input shaft; and
J. said biasing means resiliently biases said other member toward said one member.

5. The vehicle of claim 4, wherein:
K. said means drivingly interconnecting includes a driven gear coaxial to said second output shaft; and
L. said torque limiting means coacts with said driven gear to drivingly connect said driven gear to said second output shaft.

6. The vehicle of claim 5, wherein:
M. the inner periphery of said driven gear defines a frustum of a cone; and
N. said limiting means includes
1. an annular member secured to rotate with said output shaft and having an outer peripheral surface defining a frustum of a cone, and
2. means biasing said conical surfaces into frictional engagement.

7. The gear assembly of claim 5, wherein:
M. the inner periphery of said driven gear defines a pair of radially outwardly diverging frusto-conical surfaces; and
N. said torque limiting means includes
1. first and second annular members each secured to said second output shaft and each defining a frusto-conical surface on its outer periphery positioned to mate with a respective one of said diverging conical surfaces on said driven gear,
2. means preventing axial movement of said first annular member, and
3. means biasing said second annular member toward said first annular member, thereby biasing said conical surfaces into frictional engagement.

8. The gear assembly of claim 1, wherein:
F. said means drivingly interconnecting includes a driven gear coaxial to said second output shaft; and
G. said torque limiting means coacts with said driven gear to drivingly connect said driven gear to said second output shaft.

9. The gear assembly of claim 8, wherein:
H. the inner periphery of said driven gear defines a frusto-conical surface; and
I. said limiting means includes
1. an annular member secured to rotate with said output shaft and having an outer peripheral surface defining a frusto-conical surface, and
2. means biasing said conical surfaces into frictional engagement.

10. The gear assembly of claim 9, wherein:
J. the inner periphery of said driven gear defines a pair of radially outwardly diverging frusto-conical surfaces; and
K. said torque limiting means includes
1. first and second annular members each secured to said second output shaft and each defining a frusto-conical surface on its outer periphery positioned to mate with a respective one of said diverging conical surfaces on said driven gear, and
2. means preventing axial movement of said first annular member, and means biasing said second annular member toward first annular member, thereby biasing said conical surfaces into frictional engagement.

11. A drive transfer gear assembly for a vehicle of the type including front and rear drive axles each defining a differential housing, and a differential gear set disposed in each such housing and drivingly connected to wheels on the outboard ends of the axles; said assembly comprising:
a housing secured at its rear to the front of said rear axle differential housing;
an input shaft in said housing and extending forwardly through the front of said housing;
torque proportioning gear means having an input gear driven by said input shaft and first and second relatively rotatable output gears;
a first output shaft coaxial to said input shaft and driven at its forward end by said first output gear;
a second output shaft in said housing and extending forwardly through the front of said housing;
means drivingly connecting said second output gear to said second output shaft; and
a pinion secured to the rearward end of said first output shaft and in mesh with the ring gear of said rear differential gear set.

12. A drive train assembly for a motor vehicle of the type including an engine disposed in a position forwardly of said vehicle and an engine drive shaft extending generally longitudinally of the vehicle and driven at its forward end from the engine; said drive train comprising:
a drive front axle;
a front axle drive shaft extending generally longitudinally of said vehicle and drivingly connected at its forward end to said drive front axle; and
a rear axle assembly journaling road wheels and including
1. left and right axle shafts arranged on the rear axle axis and drivingly connected to said wheels;
2. an axle shaft differential gear assembly disposed between said axle shafts and differentially connected thereto, and
3. a drive transfer gear assembly disposed forwardly of said differential gear assembly and including
a. an input shaft disposed generally longitudinal of said vehicle and drivingly connected to the rearward end of said engine drive shaft,
b. a first output shaft drivingly connected to the input of said differential gear assembly, and
c. a second output shaft drivingly connected to the rearward end of said front axle drive shaft and disposed generally parallel to said input shaft, said second output shaft spaced laterally of a longitudinal axis defined by said input shaft and below said rear axle axis.

13. A drive train according to claim 12, wherein:
D. said drive front axle includes
1. a rigid axle housing including generally horizontally extending end sections, and
2. a generally horizontally extending center section dropped below the axis of said end sections and defining a differential housing.

14. A rear axle assembly for a motor vehicle comprising:
a rigid, unitary housing structure including
1. left and right axle shaft housing sections, 2. a differential housing section intermediate said shaft housing sections, and
3. a drive transfer housing section disposed forwardly of said differential housing section;

a side gear differential gear set disposed in said differential housing section and including a ring gear journaled for rotation substantially on the axis of said shaft housing sections; and a drive transfer gear assembly disposed in said drive transfer housing section and including
1. an input shaft adapted to be drivingly connected to the engine drive shaft,
2. a first output shaft extending generally transversely of said axis and differentially connected at its forward end to said input shaft and meshingly engaging at its rearward end with said ring gear and
3. a second output shaft differentially connected to said input shaft and adapted to be connected by a forward drive shaft to the front axle of the vehicle.

15. A vehicle comprising:
A. a prime mover;
B. a rear drive axle assembly including
1. a differential housing,
2. a differential in said housing having an input gear and a pair of output gears, and
3. a pair of ground engaging wheels driven by said pair of output gears;
C. a front axle assembly including
1. a differential having an input gear and a pair of output gears, and
2. a pair of ground engaging wheels driven by said pair of output gears;
D. a drive transfer housing secured to said rear axle differential housing forward of said rear axle differential;
E. an input shaft in said transfer housing drivingly connected to said prime mover;
F. a torque proportioning gear means in said transfer housing having an input gear driven by said input shaft and first and second relatively rotatable output gears each receiving a predetermined percentage of the torque driving said input gear;
G. first drive means drivingly connecting said first output gear to the input gear of said rear axle differential;
H. second drive means drivingly connecting said second output gear to the input gear of said front axle differential;
I. clutch means operative when actuated to prevent relative rotation between said first and second output gears; and
J. means limiting the amount of torque driving one of said differential input gears when relative rotation between said first and second output gears is prevented.

* * * * *

UNITED STATES PATENT AND TRADEMARK OFFICE
CERTIFICATE OF CORRECTION

PATENT NO. : 4,050,328
DATED : September 27, 1977
INVENTOR(S) : Rowland C. Romick It is certified that error appears in the above-identified patent and that said Letters Patent are hereby corrected as shown below:

Col. 5, line 50: Delete "he".

line 57: After "from" delete "the".

In the Claims:

the upper case alphabetical identifiers preceding each of the clauses were to be deleted.

Signed and Sealed this

Thirty-first Day of January 1978

[SEAL]

Attest:

RUTH C. MASON
Attesting Officer

LUTRELLE F. PARKER
Acting Commissioner of Patents and Trademarks